June 27, 1961 A. H. ROBSON 2,990,117
AIR HEATER FUEL CONTROL SYSTEM
Filed Oct. 30, 1959

*INVENTOR.*
AUBREY H. ROBSON
BY
*Edward C. Grenz*
ATTORNEY

United States Patent Office 2,990,117
Patented June 27, 1961

2,990,117
AIR HEATER FUEL CONTROL SYSTEM
Aubrey H. Robson, Rock Island, Ill., assignor to American Air Filter Company, Inc., Louisville, Ky., a corporation of Delaware
Filed Oct. 30, 1959, Ser. No. 849,830
8 Claims. (Cl. 236—10)

This invention relates to a fuel and combustion control system for a portable air heater of the fluid fuel burning type.

This invention has application to that type of heater in which fuel is supplied to a bypass type burner nozzle at a relatively constant pressure, part of the fuel normally being discharged from the nozzle into the burner and the remaining fuel passing through a built-in nozzle bypass to a nozzle return line. The rate at which fuel is discharged into the burner is dependent upon the fuel back-pressure in the nozzle return line—a high back-pressure causing more fuel to be discharged into the burner than a low back pressure. The degree of back-pressure built up in the nozzle return line may be controlled by a throttling valve controlled in response to variations in temperature of the heated air discharged from the heater. Such a heater so controlled is exemplified by Hubbard U.S. Patent 2,758,591.

I have recently proposed, as disclosed in my co-pending application Serial No. 849,882, filed October 30, 1959, that where a heater having a bypass type fuel control system is applied to heat a relatively confined space, and in which the air from the space is recirculated or returned to the heater from that space, that a pair of throttle valves arranged in parallel be utilized in the nozzle return line. One valve is controlled in response to the heater discharge air temperature and the other is controlled in response to the heater inlet air temperature. The system is arranged so that during the space warm-up period the discharge air temperature responsive valve effectively controls burner fire at a rate providing the selected discharge air temperature, and then, after the space reaches a comfort temperature due to sustained operation of the heater at the selected discharge air temperature, the inlet air temperature responsive valve assumes control to provide a reduced rate of burner fire ample to satisfy the reduced demand for heat in the space. While such an arrangement provides a rapid warm-up of the space to be conditioned and thereafter provides air at a relatively low discharge temperature, under certain conditions the heat loss of the conditioned space may be so low that even the relatively low temperature air discharged into the space will result in overheating of the space.

Specifically, assuming a heater having a capacity of from 20,000 to 200,000 B.tu. per hour, a ventilating air volume of 350 c.f.m., and a heater inlet air temperature of 70°, then, at the minimum capacity of 20,000 B.t.u. per hour the temperature of the air discharged into the van or space will be about 123° F. It will be readily appreciated that if the heat loss of the space is fairly low, the continued addition of extra heat to the confined space can result in overheating of the space.

Therefore, one object of the present invention is to provide, in a fuel control system for a heater of the class described, means to control the burner fire in an on-off fashion in response to a condition indicative of space overheat occurring during continuous firing at the minimum heating capacity of the heater.

In carrying out the invention, means sensing the fuel back-pressure in the nozzle return line are provided to respond to a relatively low pressure corresponding to a condition of minimum burner fire to cause the flow of fuel to the nozzle to be terminated and shunted around the nozzle through a separate conduit connecting the nozzle supply line and nozzle return line. The fuel back-pressure continues to be controlled in accordance with the difference between a selected air temperature and a sensed air temperature so that fuel flow to the nozzle will be re-established in response to a rise in fuel back-pressure indicative of the need of heat.

To avoid causing a change of material magnitude in the fuel pressure in the nozzle return line upon actuating the means diverting the fuel to the nozzle shunt conduit, I provide flow restricting means in the nozzle shunt conduit to exert approximately the same flow resistance as encountered when flow is through the nozzle.

The invention will be explained in connection with the accompanying drawing illustrating several embodiments by way of example, and wherein.

Figure 1:
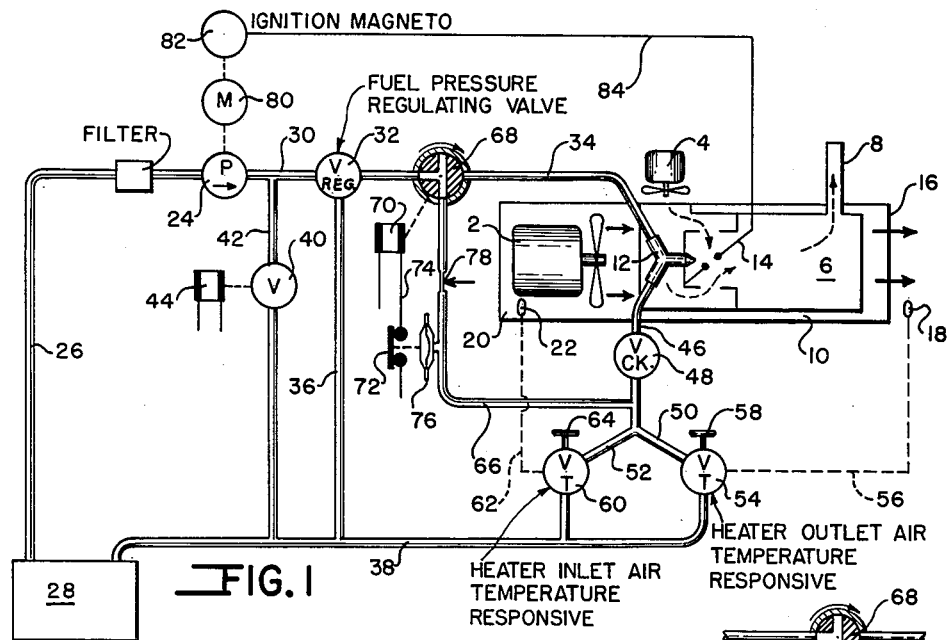
FIGURE 1 is a diagrammatic view of a fuel control system and heater embodying the present invention.

Referring to FIGURE 1, the heater includes: forced air blower means 2 providing ventilating air to be heated, the ventilating air flowing as indicated by the solid arrows; combustion air blower means 4 providing combustion air for the burner and combustion chamber 6, the combustion air flowing as indicated by the dotted arrows into the combustion chamber 6 and then out of a stack 8; means defining a heat exchange passageway 10; a burner nozzle of the bypass type 12 adapted to receive fuel and discharge at least part of it into the burner 6; ignition electrodes 14 adjacent the nozzle jet orifice; ventilating air outlet 16 through which the heated ventilating air passes by way of suitable conveying ducts to the space to be heated; an outlet air temperature sensing element 18 disposed in the path of heated ventilating air being discharged from the outlet 16; a heater air inlet 20 into which air returned from the conditioned space is conveyed by suitable ducts; and, inlet air temperature sensing element 22.

Referring now to the fuel flow system, a pump 24 draws fuel through conduit or line 26 from the fuel tank 28 which contains gasoline or a similar liquid fuel. The pump 24 discharges fuel into line 30 which contains a balanced regulating valve 32 operable to open and pass fuel to a nozzle supply line 34 when the fuel delivered to the inlet side of the valve equals or exceeds, say 150 p.s.i. (pounds per square inch). The excess fuel to valve 32 is bypassed from the regulating valve through a secondary bypass line 36 connected to a common tank return line 38. It will be apparent then that fuel only flows into the nozzle supply line 34 at the mentioned pressure; and if the pressure on the supply side of the regulating valve is below that amount, the regulating valve will remain closed.

When the pump 24 is operating, the position of two-position (open-closed) valve 40 in primary bypass conduit 42 determines whether the regulating valve 32 will be open or closed. This valve 40 is biased to an open position and snaps to a closed position when solenoid 44 is energized. With the pump 24 operating and the valve 40 closed, the pressure in line 30 rapidly builds up and causes the regulating valve 32 to open and pass fuel into the nozzle supply line. When valve 40 opens, the pressure in line 30 very quickly decreases to a value below that required to maintain the regulating valve open, and all the fuel will bypass back to the common tank return line 38 through the primary bypass line 42.

Under normal operating conditions with valve 40 closed and regulating valve 32 open, the fuel supplied to nozzle supply line 34 passes to the inlet side of the nozzle 12 where part of it is discharged into the burner 6 and part of it passes from the outlet side of the nozzle into a single nozzle return line 46. This nozzle return line contains a check valve 48 which prevents reverse flow of fuel into the nozzle under any conditions.

The single nozzle return line 46 is divided into a pair of parallel nozzle return lines 50 and 52. Line 50 contains a throttling valve 54 connected by capillary line 56 to the heater outlet air temperature sensing element 18. Throttle valve 54 is also provided with a temperature selection knob 58 for selecting a desired discharge air temperature. Parallel line 52 contains throttle valve 60 connected by capillary line 62 to inlet air temperature sensing element 22. Throttle valve 60 also has a temperature selection knob 64. The fuel outlet side of each of these valves 54 and 60 is connected to the common tank return line 38.

The throttle valve 54 is adjusted by means of the temperature selection knob 58 to control burner fire at a rate providing a selected discharge air temperature. The sensing element 18 associated with the valve 54 senses the discharge air temperature produced by the heater and causes the valve to move in an opening or closing direction in response to a sensed discharge air temperature respectively above or below the selected discharge air temperature. Such a valve is known in the art and further explanation is not considered necessary herein.

Valve 60 is structurally and operationally similar to valve 54 but several differences should be noted. In this connection, the element 22 for valve 60 is mounted in the inlet air passage for the heater and therefore senses return air while element 18 controlling valve 54 senses discharge air. Also, the control element 22 and capillary line are charged to respond and exert a modulating control on valve 60 within a temperature range of, for example, 60° to 90° F., whereas the element 18 for valve 54 is charged to respond in a temperature range, for example, of 130° to 180° F. If desired, valve 60 may be provided with a port sized to permit a lower back fuel back-pressure at maximum open position than valve 54.

It will be apparent that either valve can affect back pressure in the nozzle return line and consequently exert some control over the rate at which fuel is discharged from the nozzle into the burner. If both valves are in a closed position, the maximum quantity of fuel will be discharged into the burner. With valve 60 closed and valve 54 open to its maximum position the fuel rate into the burner will be substantially reduced. If valve 60 has a larger maximum port opening than valve 54, then with valve 54 closed and valve 60 open to its maximum position (corresponding to the minimum heating capacity with continuing burner fire) the fuel rate into the burner will be approximately the minimum value at which a stable flame can be supported. When this occurs the fuel back-pressure in the nozzle return line will be at its practical minimum since the maximum quantity of fuel will be bypassed through the nozzle and through the valve 60 back to the common tank return line. This will also be indicative that under the conditions then existing the space is being overheated.

To the end of avoiding this overheating, and in accordance with this invention, means are provided to terminate all fuel flow to the burner by bypassing it around the nozzle burner. Thus, a nozzle shunt conduit or line 66 has one end connected to a diverting or shunt valve 68 in the nozzle supply line 34 and has the other end connected to the nozzle return line 46 at a point between the check valve 48 and the parallel throttle valves 54 and 60. The shunt valve 68 (which is shown in FIGURE 1 in a position preventing fuel flow into the nozzle supply line 34 and permitting flow into the nozzle shunt conduit 66) is controlled by a solenoid 70. The solenoid is energized when electrical switch 72 in electrical line 74 is closed. Closure of switch 72 is controlled by fuel pressure responsive means 76 connected to sense fuel pressure in a fuel line in open communicatoin with and containing fuel at the same pressure as the nozzle return line. As will be readily appreciated, the fuel pressure responsive element is biased in a direction opposing the force exerted by the fuel pressure so that switch 72 is closed when the fuel pressure sensed is below a predetermined minimum. The element 76 can be set, for example, to close switch 72 in response to a fall in pressure below 24 p.s.i. and to open switch 72 in response to a rise in pressure above 32 p.s.i.

Assuming the shunt valve 68 is in a position passing fuel to the nozzle, when the fuel pressure in the nozzle shunt conduit 66 (which is connected to the nozzle return line and therefore contains fuel at the same pressure as in the nozzle return line) falls to the predetermined minimum indicating valve 60 is open to its practical limit with respect to a stable flame, the fuel pressure responsive means 76 causes switch 72 to close. This energizes solenoid 70 which actuates the shunt valve 68 to a position diverting fuel flow from the nozzle supply line 34 into the nozzle shunt conduit 66. This cuts off burner fire since fuel is then not available at the nozzle for discharge into the burner.

To avoid any abrupt change in the fuel pressure sensed by the element 76 when fuel is diverted, an adjustable restricting orifice 78 is provided in the shunt conduit. This orifice is adjusted to provide the same resistance to fuel flow as the nozzle 12, check valve 48 and connecting lines 34 and 46.

After valve 68 is switched to its shunt position, fuel will continue to flow in the nozzle shunt conduit 66 until the fuel back-pressure sensed by fuel pressure responsive element 76 rises above the predetermined low value. The rise in fuel back-pressure sensed by the element 76 will be occasioned by valve 60 moving towards a closed position from its wide-open position. This closing movement of valve 60 in turn results from inlet air temperature sensing element 22 detecting that the inlet air temperature has dropped due to the burner fire being cut off. When the sensed fuel pressure in the nozzle shunt conduit rises, switch 72 will be opened by element 76, the solenoid 70 de-energized, and the shunt valve will return to a position restoring fuel flow to the nozzle. Thus, burner fire resumes at a relatively low level.

If continued burner fire at this low level again causes valve 60 to assume a wide-open position, the correspondingly decreased fuel back-pressure will again result in actuation of the shunt valve to a position terminating fuel flow to the nozzle. Thus the on-off burner fire will continue so long as the burner fire rate corresponding to a near minimum fuel back-pressure results in substantial overheating of the space as correspondingly sensed by the return air element 22.

Figure 2:
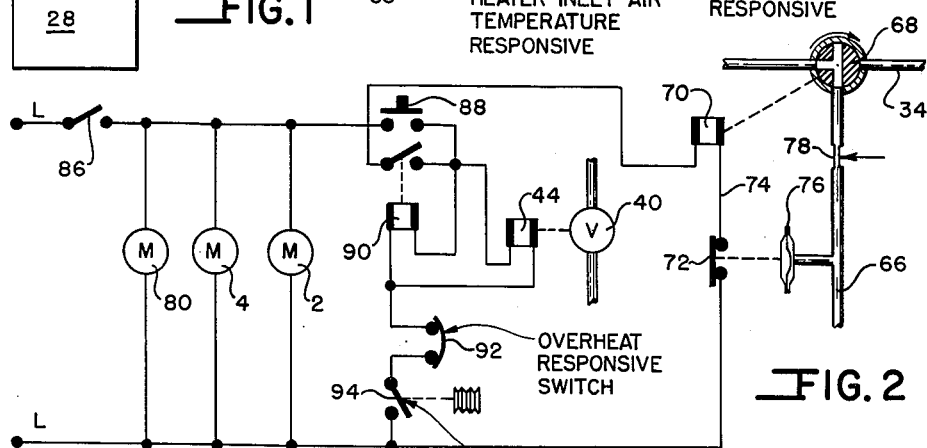
FIGURE 2 is an electrical diagram illustrating electrical connections of elements used where electrical power is available for powering the heater.

The fuel pump 24 is driven by accessory drive motor 80 which also drives the ignition magneto 82 connected by electrical line 84 to electrodes 14. When an electrical power source is available to power certain of the components associated with the heater, a circuit arrangement such as shown in FIGURE 2 may be provided. Closure of line switch 86 energizes the ventilation air motor 2, combustion air motor 4, and an accessory drive motor 80. With these elements operating, the heater is in a condition for combustion to be established. That is, the required air flow to support combustion, and to receive the heat released by the combustion is available, and the fuel is being pumped through the primary bypass line 42 back to the tank 28.

A manually closable combustion starting switch 88 is arranged in series with a holding relay coil 90 having solenoid 44 which controls the main burner fuel valve 40 in parallel therewith; a normally closed overheat switch 92 which may be conveniently located to sense an overheated heater condition and open in response thereto; and an air flow responsive switch 94. When energized, coil 90 operates to close its asociated switch 96 so that the manually closed switch 88 may be released while the switch 96 maintains the circuit complete.

It will be understood that when the heater is being operated from a cold start, both valves 54 and 60 will be closed because of the demand for heated air at both the outlet and inlet of the heater. Also, shunt valve 68 will be in a position to divert fuel flow into the shunt conduit since, until regulating valve 32 opens and permits fuel flow via one way or another to the throttle valves, the fuel back-pressure sensed by element 76 is below the minimum value.

Now, upon closing the combustion starting switch 88 the solenoid 44 is energized and closes burner fuel valve 40. This causes the fuel pressure which builds up in line 30 to open regulating valve 32. Fuel will then flow through shunt valve 68 into the shunt conduit 66 to the closed throttle valves 60 and 54. Thus the fuel back-pressure quickly rises to a value which causes pressure responsive element 76 to open electrical switch 72 in line 74. This de-energizes the solenoid 70 controlling shunt valve 68 and valve 68 is actuated to a position permitting fuel flow to the nozzle 12. Since the throttle valves are fully closed, all of this fuel is discharged into the burner. Since an igniting spark is available at all times that fuel pump 24 is operating, combustion will be initiated in the burner as soon as fuel is discharged from the nozzle.

The heated ventilating air temperature will soon rise to the selected temperature and warm the condition space. As explained heretofore, after the discharge air temperature rises to its selected value, the throttle valve 54 will operate in an attempt to maintain the discharge air temperature at the selected value. However, assuming the temperature of the inlet air sensed by element 22 ultimately rises above its selected value, the throttle valve 60 will open in response thereto and assume control of fuel back-pressure while throttle valve 54 will move to a closed position.

Then, if the heater inlet air temperature rises to a value causing throttle value 60 to move to a fully open position, this condition will, in accordance with previously described operation, cause the shunt valve 68 to divert fuel away from the nozzle and thus cut off burner fire. With the burner fire cut off, the conditioned space temperature will fall until the heater inlet air temperature sensed by element 22 causes valve 60 to move towards a sufficiently closed position to build up fuel back-pressure to a value operable to switch fuel flow back to the nozzle and re-establish burner fire. Thus the heater will operate with either modulating fuel flow to the burner or in an on-off fashion in accordance with the heating demands manifested at the inlet to the heater.

Figure 3:
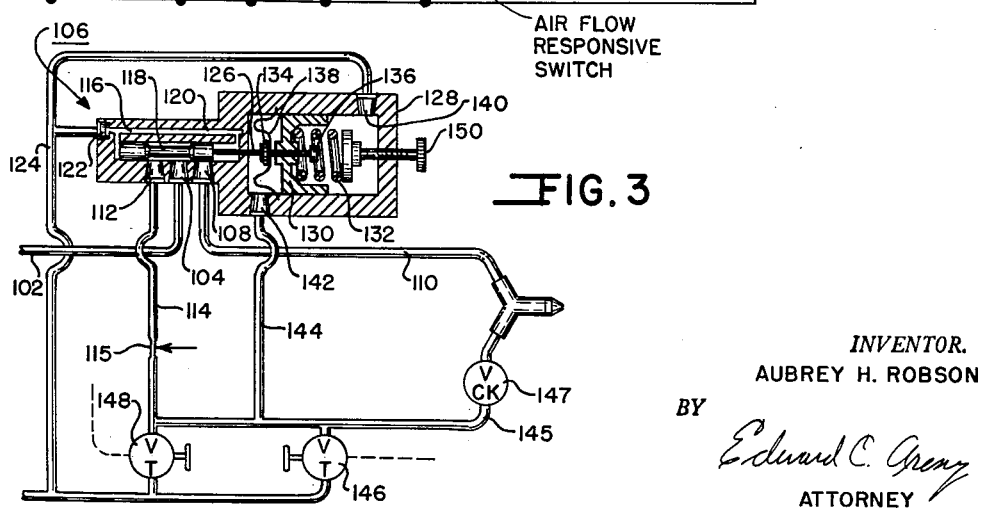
FIGURE 3 is a diagrammatic view of a portion of an alternative fuel control system and illustrating in cross section one specific fuel pressure powered valve adapted to divert fuel from the nozzle.

FIGURE 3 illustrates a portion of an alternate fuel system having a shunt valve actuated or powered by fuel pressure rather than being electrically powered. Such an arrangement is desirable for heaters which are self-powered in the sense that no outside electrical power is used. In that connection and as disclosed in the noted Hubbard patent, an internal combustion engine prime mover is used to drive a combined ventilation air-combustion air blower, a gear box take-off is used for the accessory drive, and the main bypass burner valve is arranged to be manually closed and maintained in a closed position by fuel pressure.

As shown in FIGURE 3, the fuel line 102 leads from the fuel pressure regulating valve (not shown) to an inlet port 104 of shunt valve designated generally 106. One outlet port 108 is connected to the nozzle supply line 110, while the alternate outlet port 112 is connected to nozzle shunt line 114. It is noted that nozzle shunt line 114 has an adjustable orifice 115 to permit equalizing resistance to flow in line 114 to that found in the alternate flow path.

The inlet and outlet ports are connected to a common chamber 116 having slide valve 118 therein. The end portions of slide valve 118 are of substantially the same cross-section as the chamber while the central portion of the slide valve is of reduced cross-section for a length sufficient to provide communication between the inlet port 104 and either of the alternate outlet ports 108 or 112. Each end of the chamber is connected by a fuel relief bore 120 to a common fuel relief bore 120 which in turn terminates in a fuel relief port 122. This arrangement permits any fuel which accumulates in the ends of the chamber to be passed to a fuel relief conduit 124 when the slide valve is displaced in either direction.

The slide valve 118 is actuated by a drive rod 126 secured at one end to the slide valve and sealably passing through left end wall of cylinder 128. Cylinder 128 contains piston 130 which is biased to the left by balance spring 132. The piston slides freely, within limits, upon drive rod 126 which extends through the center of the piston face and has secured thereto on oposite sides of the face boss-like piston stops 134 and 136. The left-hand chamber of the cylinder contains several overcenter snap springs 138 directed radially inwardly from secured position in the cylinder wall and which function to give bias to the piston in either direction when the centrally disposed, movable ends of the springs move to either side of the neutral axis of the springs. The right-hand chamber of the cylinder includes a fuel relief port 140 also connected to relief line 124.

The left-hand chamber of the cylinder receives fuel through port 142 connected by line 144 to the nozzle return line 145 at a point between the downstream side of the check valve 147 and the upstream side of throttle valves 146 and 148. Thus, an increase in fuel pressure in the nozzle return line causes a corresponding increase in fuel pressure in the left-hand chamber and tends to move piston 130 to the right against balance spring 132. A decrease in fuel pressure in the nozzle return line and in the left-hand chamber tends to permit the spring 132 to move the piston to the left. The tension of the balance spring 132 can be increased or decreased by adjusting knob 150.

With the elements in the positions shown in FIGURE 3 (which are the positions they would be in when the heater is started) and assuming the pressure regulating valve opens to pass fuel into line 102 and that both throttle valves 146 and 148 are closed to demand heat, then, fuel pressure will rapidly build up in the nozzle return line and consequently also build up in the left-hand chamber of the cylinder. This build up of pressure causes the piston to progressively move to the right upon rod 126. When the piston engages the right-hand stop 136 and causes movement of the stop and rod to the right, the centrally disposed ends of the snap springs 138 will be moved to the right past dead center and will thereby contribute to the force to the right causing rod 126 and slide valve 118 to plunge to an extreme right position. This movement closes port 112 and opens port 108 so that fuel flow is switched from the nozzle shunt line 114 to the nozzle supply line 110. With fuel supplied to the nozzle and discharged therefrom, burner fire is initiated.

Now assume that in accordance with previous explanation the heating demands become satisfied and the conditioned space begins to overheat so that throttle valve 148 progressively moves to an extreme open position. As this occurs, the fuel pressure in the nozzle return line 145 and in the left-hand chamber of the cylinder 128 is correspondingly progressively reduced. As the pressure is reduced, it reaches a value at which the leftwardly directed force of the balance spring 132 overcomes the rightwardly directed combined force of the fuel presssure plus overcenter snap springs 138. As the overcenter springs are moved to the left of a dead center position the drive rod 126 and slide valve 118 will be plunged to the left. This will close shunt valve port 108 and open port 112 so that fuel flow will be switched to the nozzle shunt conduit. Upon a subsequent movement of throttle valve 148 away from a fully open position in response to a demand for more heat, the nozzle return line fuel pressure and left-hand chamber fuel pressure will rise causing the slide valve 118 to again be moved to its alternate position.

The invention is considered to have its primary application in a substantially closed air system having separately responsive throttle valves, and wherein variations in heater inlet air temperature reflecting a space temperature cause variations in burner fire. However, the inventive concept is also applicable to an air heater which has, in place of the parallel throttle valves, a single throttle valve controlled by discharge air temperature. For such service this single throttle valve is designed so that in a wide open position in which it exerts a minimum resistance to fuel flow the fuel back-pressure is at a low value corresponding to the lowest rate of fuel discharge into the burner which will support a minimum stable fire. This minimum fuel back pressure will cause fuel to be shunted around the nozzle and stop burner fire as heretofore disclosed until the discharge air temperature drops sufficiently to cause the discharge temperature sensing element to move the throttle valve in a closing direction to increase fuel back-pressure above the minimum and restore burner fire. It will be appreciated that under normal conditions, the change from modulating to on-off control of the burner will only occur when the minimum heating capacity causes the temperature of the discharge air to exceed the setting sufficiently to cause the throttle valve to move to a wide open position. Such a condition arises when a heater having either a relatively low air flow volume, or a high minimum heating capacity, or both, is used with incoming air of a temperature sufficiently high to cause such a condition.

Having described my invention, I claim:

1. A fuel and combustion control system for an air heater comprising: a fuel pump; a fuel pressure regulating valve connected to receive fuel from said pump, and pass it at a relatively constant pressure; a nozzle supply conduit; a diverting valve connected to receive said fuel, said valve being operable to a first position for passing said fuel to said nozzle supply conduit, and to a second position diverting fuel from said nozzle supply conduit; a bypass type nozzle having an inlet connected to said nozzle supply conduit, an orifice for discharging fuel into a burner, and a bypassed fuel outlet; a nozzle return conduit connected to said nozzle outlet; a check valve in said return conduit to prevent reverse flow of fuel therein; first and second branch return conduits connected to said nozzle return conduit; a first throttle valve in said first branch conduit operable towards open and closed positions in response to discharge air temperatures produced by said burner respectively above and below a first selected air temperature within a first air temperature range; a second throttle valve in said second branch conduit operable towards open and closed positions in response to air temperatures of inlet air to be heated by said burner respectively above and below a selected air temperature within a second relatively lower air temperature range; a nozzle shunt conduit connected to said diverting valve for receiving fuel when said diverting valve is in said second position and passing said diverted fuel to said nozzle return line at a point between said check valve and said throttle valves; means responsive to the fuel back pressure at said point for operating said diverting valve to said second position in response to a fall in fuel back pressure corresponding to said second throttle valve moving to a fully open position, and to said first position in response to a rise in fuel back pressure corresponding to said second throttle valve moving from said fully open position.

2. The system of claim 1 including: main fuel bypass means including a main bypass conduit having one end in communication with the outlet of said fuel pump and having a two position valve therein adapted to be maintained in a closed position during normal heater operation and operable to an open position in response to a predetermined maximum air temperature indicative of said burner producing overheated air.

3. The system of claim 1 including: means in said nozzle shunt conduit for adjusting the resistance to fuel flow through said shunt conduit to substantially match the resistance to fuel flow encountered in the alternate flow path including said nozzle and said check valve.

4. In a fuel and combustion control system for an air heater adapted to be connected normally to receive air to be heated from the space being conditioned by said heater: means for supplying fuel at a relatively constant pressure; a diverting valve connected to receive said fuel and having a first outlet and an alternate outlet; a nozzle return line; a bypass type nozzle connected to receive fuel from said first outlet and adapted to discharge fuel into a burner at a rate dependent upon fuel back pressure in said nozzle return line; a check valve in said nozzle return line; a nozzle shunt conduit connected to said alternate outlet and providing a parallel fuel path around said nozzle to said nozzle return line; throttle valve means in said nozzle return line for varying the fuel back pressure; means for controlling said throttle valve means to vary fuel back pressure in response to departures in air temperature produced by said burner from selected air temperatures; and means responsive to a decrease in fuel back pressure to a predetermined minimum corresponding to a practical minimum rate of said fuel discharge into said burner to actuate said diverting valve to said alternate outlet position so that fuel flow to said nozzle is terminated.

5. In a fuel and combustion control system for an air heater: a nozzle fuel supply conduit; a nozzle fuel return conduit; a bypass type burner nozzle connected between said supply and return conduits and adapted to receive fuel and to discharge fuel into a burner at a rate dependent upon fuel back pressure in said return conduit; means for supplying fuel to said nozzle fuel supply conduit at a relatively constant pressure; a check valve in said nozzle return conduit preventing reverse fuel flow in said return conduit; throttle valve means in said return conduit for varying said fuel back pressure in response to departures in the temperature of the heated air produced by said burner from a selected temperature; a fuel bypass conduit connected between said nozzle supply conduit and said nozzle return conduit for shunting fuel around said nozzle; a shunt valve operable in a first position to shunt fuel into said bypass conduit and around said nozzle, and a second position to pass fuel to said nozzle and shut-off said bypass conduit; and means responsive to a fall in said fuel back pressure to a predetermined minimum value to operate said shunt valve means to said first position and thereby terminate fuel supply to said nozzle, and responsive to said fuel back pressure being above said minimum predetermined value to operate said shunt valve means to said second position and restore fuel supply to said nozzle.

6. A fuel and combustion control system for an air heater, comprising: a source of liquid fuel; fuel pump means; a fuel pressure regulating valve connected to receive fuel from said pump means and operable, when open, to pass it at a relatively constant pressure; a main bypass line having one end connected between said pump means and said regulating valve, said line including a valve therein operable, when open, to permit the return of fuel to said fuel source and operable, when closed, to cause said regulating valve to open and pass fuel; means to close said main bypass line valve when normal heater operation is to be initiated; a fuel line including a shunt valve connected to receive fuel from said regulating valve, said shunt valve being operable to alternate positions; a nozzle supply line connected to receive fuel from said shunt valve in the first of said alternate positions; a nozzle return line; a burner nozzle of the bypass type connected between said nozzle supply line and said nozzle return line, said nozzle return line including a check valve to prevent reverse flow of fuel therein; a nozzle shunt line connected to receive fuel from said shunt valve in the second of said alternate positions and shunt said fuel around said nozzle to said nozzle return line; throttle valve means connected downstream from said check valve and operable to increase and decrease fuel back-pressure in said nozzle return line in response to departures in air temperature produced by said burner respectively below and above a selected temperature; and fuel pressure responsive means responsive to a fall in fuel pressure in said nozzle return line below a predetermined low range to operate said shunt valve to said second alternate position for terminating all fuel flow to said nozzle by shunting said fuel around said nozzle, and to a rise in fuel pressure in said nozzle return line above said low range to operate said shunt valve to said first alternate position for restoring fuel flow to said nozzle.

7. The system of claim 6 wherein: said fuel pressure responsive means includes a piston cylinder having a chamber in communication with said nozzle return line so that said chamber is adapted to contain fuel at substantially the same pressure as said nozzle return line; piston means in said chamber movable within limits in one direction upon an increase in said fuel pressure and in an opposite direction upon a decrease in fuel pressure; and means connecting said shunt valve for actuation to said alternate positions in accordance with movement of said piston means.

8. The system of claim 7 including: means biasing said piston means in said opposite direction throughout the range of said piston means travel; and separate means biasing said piston towards either end travel position from a predetermined intermediate neutral position of said separate biasing means, so that in a movement of said piston means from one extreme end travel position to another said separate biasing means provides force resisting said movement until said piston means causes said separate biasing means to pass through neutral position and then provides force contributing to said piston means movement.

References Cited in the file of this patent
UNITED STATES PATENTS

| | | |
|---|---|---|
| 2,262,825 | Welliver | Nov. 18, 1941 |
| 2,290,350 | Olches | July 21, 1942 |
| 2,334,679 | Mason et al. | Nov. 16, 1943 |
| 2,794,599 | Irwin | June 4, 1957 |